US008880628B2

(12) United States Patent
Arora et al.

(10) Patent No.: US 8,880,628 B2
(45) Date of Patent: Nov. 4, 2014

(54) SMARTER MECHANISM TO IMPLEMENT PUSH EMAIL ON HANDHELD DEVICES

(75) Inventors: Rajni Arora, Karnal (IN); Sachin Mahajan, Maharashtra (IN); Harpreet Singh, Punjab (IN)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 13/345,328

(22) Filed: Jan. 6, 2012

(65) Prior Publication Data
US 2013/0179514 A1 Jul. 11, 2013

(51) Int. Cl.
G06F 15/16 (2006.01)
H04L 12/58 (2006.01)
G06Q 10/10 (2012.01)

(52) U.S. Cl.
CPC .............. H04L 51/00 (2013.01); *G06Q 10/107* (2013.01)
USPC ........................................................ 709/206

(58) Field of Classification Search
CPC  G06Q 10/107; H04L 12/5855; H04L 12/581; H04L 12/582; H04L 12/587; H04L 12/58; H04L 51/00; H04L 51/04; H04L 51/38; H04L 51/06; H04L 51/12; H04L 51/14; H04M 1/72547
USPC ........................................................ 709/206
See application file for complete search history.

(56) References Cited

U.S. PATENT DOCUMENTS

| 6,850,757 | B2 | 2/2005 | Watanabe et al. | |
|---|---|---|---|---|
| 7,930,355 | B2* | 4/2011 | Aaltonen et al. | 709/206 |
| 8,005,495 | B2* | 8/2011 | Vaananen | 455/466 |
| 8,489,682 | B2* | 7/2013 | Åstrom et al. | 709/204 |
| 2001/0034226 | A1* | 10/2001 | Watanabe et al. | 455/412 |
| 2004/0162076 | A1* | 8/2004 | Chowdry et al. | 455/445 |
| 2004/0202117 | A1* | 10/2004 | Wilson et al. | 370/310 |
| 2007/0124490 | A1* | 5/2007 | Kalavade et al. | 709/230 |
| 2007/0282959 | A1* | 12/2007 | Stern | 709/206 |
| 2008/0268882 | A1* | 10/2008 | Moloney | 455/466 |
| 2009/0181705 | A1* | 7/2009 | Yin | 455/466 |
| 2009/0227272 | A1* | 9/2009 | Danzeisen et al. | 455/466 |

(Continued)

FOREIGN PATENT DOCUMENTS

WO     WO2010104764      9/2010

OTHER PUBLICATIONS

Puneet Gupta, "End to End USSD System", Tata Teleservices Ltd., Section 5, pp. 25-27, Jul. 7, 2010.

(Continued)

*Primary Examiner* — Kambiz Zand
*Assistant Examiner* — Nelson Giddins
(74) *Attorney, Agent, or Firm* — Law Offices of Ira D. Blecker, P.C.

(57) ABSTRACT

A push email system which includes an email server and an unstructured supplementary service data (USSD)-type server. The email server is configured to receive email for an email account of a mobile user and notify the USSD-type server of the receipt of the email for the mobile user. The USSD-type server is configured to send a USSD or USSD-like message to a mobile user's handheld device, the USSD or USSD-like message notifying the mobile user's handheld device of the receipt of the email by the email server for the account of the mobile user. Also disclosed is a method of pushing email to a mobile user's handheld device.

18 Claims, 2 Drawing Sheets

(56) References Cited

U.S. PATENT DOCUMENTS

| | | | | |
|---|---|---|---|---|
| 2009/0265763 | A1* | 10/2009 | Davies et al. | 726/3 |
| 2010/0093306 | A1* | 4/2010 | Hwang et al. | 455/404.2 |
| 2010/0217852 | A1* | 8/2010 | Nishida | 709/223 |
| 2011/0021219 | A1* | 1/2011 | LeBlanc et al. | 455/466 |
| 2011/0182220 | A1* | 7/2011 | Black et al. | 370/311 |
| 2011/0202661 | A1* | 8/2011 | Sener | 709/227 |
| 2012/0089674 | A1* | 4/2012 | Staykoff | 709/203 |
| 2012/0264462 | A1* | 10/2012 | Shen et al. | 455/466 |
| 2012/0311051 | A1* | 12/2012 | Banks et al. | 709/206 |
| 2013/0339438 | A1* | 12/2013 | Cherian et al. | 709/204 |

OTHER PUBLICATIONS

"CBOSS—USSD-Like Service Positioning System" [Retrieved on Oct. 10, 2011], Retrieved from the Internet: <URL:http://www.cbossbilling.com/products/cbossussdLike.html >.

Marvin Bienn, "CDMA USSD (Unstructured Supplementary Service Data)" CDMA USSD Presentation, Ericsson, Apr. 19, 2011.

"How to Get Push E-Mail on Your Cell Phone," Laptop, The Pulse of Mobile Tech, [Retreived on May 20, 2011], Retrieved from the Internet: <URL: http://www.laptopmag.com/advice/how-to/push-email-on-your-cell.aspx?page=2 >.

"Irancell Push Mail", [Retrieved on Jun. 9, 2011], Retrieved from the Internet: <URL: http://www.irancell.ir/en/layer2/?id=333>.

"Push Email Service", Syriatel Services [Retrieved on May 20, 2011], Retrieved from the Internet:<URL: http://www.syriatel.sy/Sitemap/Home/Services/Serviceslist/ServiceDetails/tabid/192/ArticleID/509/language/en-US/default.aspx >.

"Wireless Handheld Devices Risk Management Guide", Version 2.0, Department of the Premier and Cabinet—Office of e-Government, Government of Western Australia, pp. 1-9, Dec. 2007.

* cited by examiner

SMARTER MECHANISM TO IMPLEMENT PUSH EMAIL ON HANDHELD DEVICES

BACKGROUND

The present invention relates to the field of mail transmission to handheld devices and, more particularly, relates to the providing of a push email function on handheld devices utilizing USSD or USSD-type resources.

With the emergence of computer networks, electronic mail or email allows people to exchange an electronic medium mail using a computer connected to a network such as the Internet. Email is widely used by all users of the Internet including mobile users utilizing handheld devices such as cellular phones, smartphones, PDAs and other similar devices.

With the development of mobile communication technologies, various information services based on a mobile communication network have been developed. For example, Multimedia Messaging Service (MMS) has been developed based on Short Messaging Service (SMS) and Enhanced Messaging Service (EMS), which implement the transmission of information content in rich media format such as text, picture, audio and video between a mobile terminal and a service provider/content provider (SP/CP).

Handheld devices are widely used among email users. Furthermore, handheld devices have a flexible and convenient mobility. Thus, browsing and transmitting emails using handheld devices may find wide application among mobile users.

Push email is a method in which the mobile receiver does not have to poll an email server to check for any new email. Instead, the email server may inform the handheld device when new email is received so that the handheld device may initiate the fetching of emails.

BRIEF SUMMARY

The various advantages and purposes of the exemplary embodiments as described above and hereafter are achieved by providing, according to a first aspect of the exemplary embodiments, a push email system which includes an email server and an unstructured supplementary service data (USSD)-type server. The email server is configured to receive email for an email account of a mobile user and notify the USSD-type server of the receipt of the email for the mobile user. The USSD-type server is configured to send a USSD or USSD-like message to a mobile user's handheld device, the USSD or USSD-like message notifying the mobile user's handheld device of the receipt of the email by the email server for the account of the mobile user.

According to a second aspect of the exemplary embodiments, there is provided a method of pushing email to a mobile user's handheld device. The method includes receiving, by an email server, an email for an email account of a mobile user; notifying, by the email server, an unstructured supplementary service data (USSD)-type server of the receipt of the email by sending a message to the USSD-type server, the message including information identifying the mobile user and the email account of the mobile user; receiving, by the USSD-type server, the message; sending a USSD or USSD-like message to the mobile user's handheld device, the message notifying the mobile user's handheld device of the receipt by the email server of the email for an account of the user; and responsive to a message from the mobile user's handheld device, downloading the email to the user's handheld device from the email server.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

Figure 1:
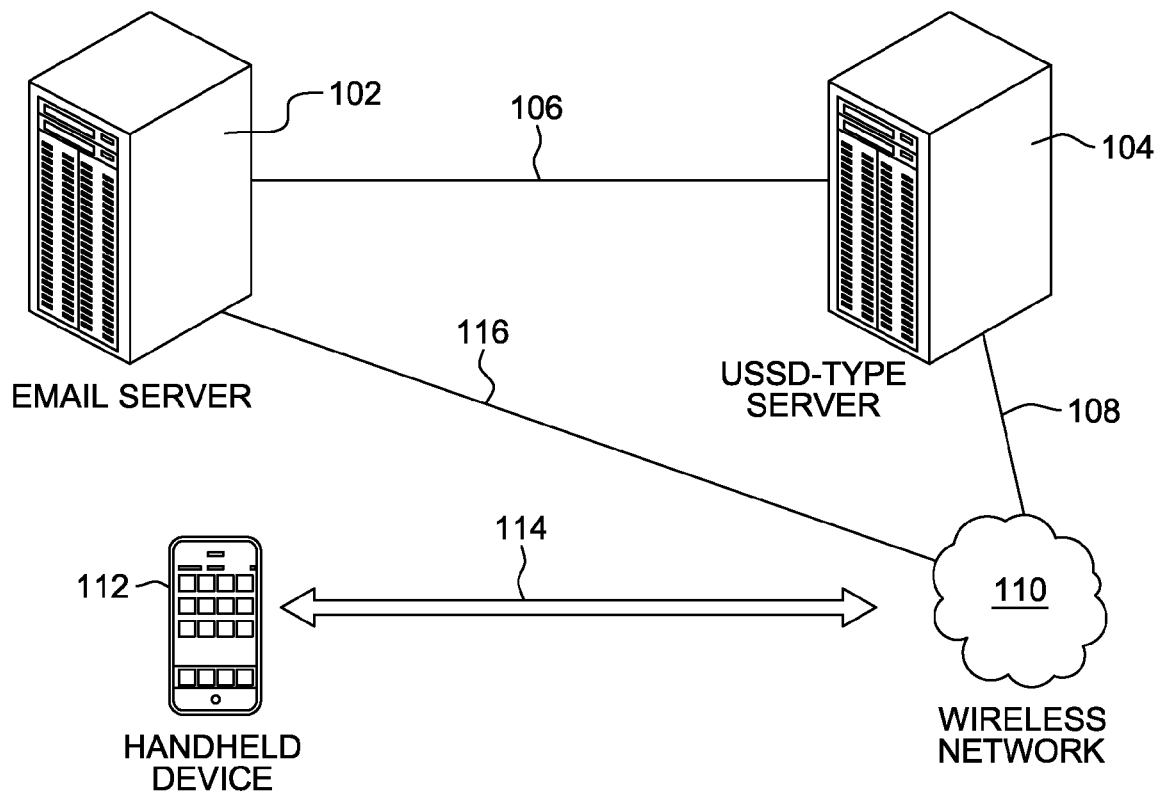
FIG. 1 is an architecture for the exemplary embodiments.

A common method of implementing push email is to have the handheld device "ping" the email server at defined intervals to check for new emails. Such a method is costly and consumes battery.

Another method of implementing push email is to have special kinds of handheld devices which are dedicated to a push email network.

The exemplary embodiments describe a cost effective way to implement push email on a handheld device while consuming less battery and without special kinds of hardware.

The exemplary embodiments utilize a USSD-type protocol on a handheld device to inform the mobile user of the receipt of an email by an email server and to initiate a data connection to fetch the email from the email server. The USSD-type protocol may be a USSD protocol or a USSD-like protocol and both are considered within the scope of the exemplary embodiments.

USSD (Unstructured Supplementary Service Data) is a protocol used by GSM cellular telephones to communicate with the service provider's computers. USSD can be used for WAP browsing, prepaid callback service, location-based content services, menu-based information services, and as part of configuring the phone on the network. USSD messages are up to 182 alphanumeric characters in length. Unlike SMS messages which use a store and forward concept, USSD messages create a real-time connection during a USSD session. The connection remains open, allowing a two-way exchange of a sequence of data. This makes USSD more responsive than services that use SMS.

GSM (Global System for Mobile Communications), is a standard set developed by the European Telecommunications Standards Institute (ETSI) to describe technologies for digital cellular networks.

CDMA (Code Division Multiple Access) is a channel access method for cellular phones. USSD is not yet compatible with CDMA. A standard has been proposed but not yet approved to implement the USSD protocol in a CDMA network. Should the USSD protocol be implemented in a CDMA network, then the exemplary embodiments may be implemented in a CDMA network using the USSD protocol.

However, USSD-like features may be currently implemented in a CDMA network by a USSD-like protocol. A USSD-like protocol may be any service that may provide features similar to the USSD protocol, such as real-time messaging, in a CDMA network.

USSD-like features may be implemented in a CDMA network by various technologies such as non-persistent SMS messaging, also known as Flash SMS system. Unlike regular SMS text messaging, non-Persistent SMS messaging is a special SMS which opens up and flashes on the mobile screen directly and thus does not occupy valuable inbox space until and unless the subscriber selects to save it as a normal SMS.

Other technologies are available which may provide a USSD-like experience on CDMA and other non-GSM networks. CBOSSussdlike from CBOSS Corporation provides USSD-like services on CDMA and other non-GSM networks.

While the other technologies mentioned above may be suitable for the exemplary embodiments, it is most preferred that the USSD protocol over a GSM wireless network be utilized for the exemplary embodiments.

As today's mobile customers demand more personalized services and faster information transmissions, network operators need a cost-effective and multi-functional USSD-type Gateway. The USSD-type Gateway supports the transmission of information over a cellular network's signaling channels. The result for operators is reduced complexity of network design and a single access portal for multiple services. The greatest feature of the new USSD-type servers allows providers to easily create and offer more sophisticated, integrated and customized services to mobile users.

Referring to the Figures in more detail, and particularly referring to FIG. 1, there is shown a proposed architecture for the exemplary embodiments. An email server 102 is connected, by wired or wireless means 106, to a USSD-type server 104. The USSD-type server may be a server implementing the USSD protocol or a USSD-like protocol. While the email server 102 and USSD-type server 104 are shown as separate devices, it is within the scope of the exemplary embodiments for a single server to have both email and USSD-type functions.

The USSD-type server 104, in turn, may be connected, by wired or wireless means 108, to a wireless network 110. The email server 102 may also be connected, by wired or wireless means 116, to the wireless network 110. It is understood that the wireless network 110 may include components such as gateways, routers, the Internet, the World Wide Web, virtual private networks and the like. Such other components are not germane to the exemplary embodiments and so are not illustrated here.

The wireless network 110 connects wirelessly 114 to a handheld device 112. The handheld device 112 may include any of the handheld devices discussed previously. The handheld device 112 may be any handheld device that is capable of implementing the USSD or USSD-like protocols. In the exemplary embodiments, the handheld device 112 preferably is a GSM device but may also be a handheld device utilizing CDMA or any other non-GSM protocol so long as it may implement a USSD-like protocol as described above. The handheld device 112 may also have both GSM and non-GSM functions so long as it is capable of implementing a USSD or USSD-like protocol.

Figure 2:
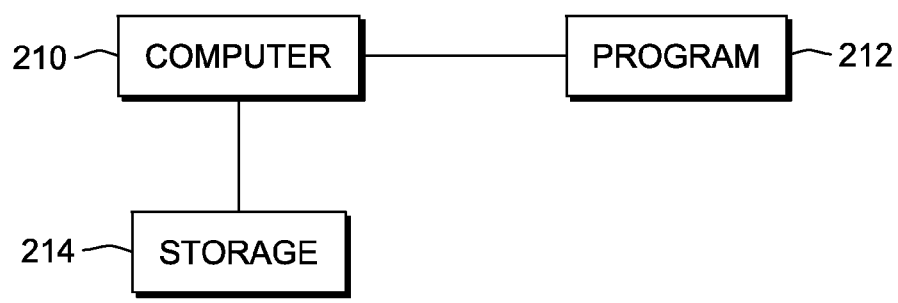
FIG. 2 is a block diagram of hardware to implement the exemplary embodiments.

Each of the servers 102, 104 may be implemented by a general-purpose computer or a special purpose device such as a hand-held computer. FIG. 2 is a block diagram that illustrates one exemplary hardware environment of the devices 102, 104. The exemplary embodiments may be implemented using a computer 210 comprised of microprocessor means, random access memory (RAM), read-only memory (ROM) and other components. The computer 210 may be a personal computer, server, mainframe computer, hand-held device or other computing device. Resident in the computer 210, or peripheral to it, will be a storage device 214 of some type such as a hard disk drive, floppy disk drive, CD-ROM drive, tape drive or other storage device.

Generally speaking, the software implementation of the exemplary embodiments, program 212 in FIG. 2, is tangibly embodied in a computer-readable medium such as one of the storage devices 214 mentioned above. The program 212 comprises instructions which, when read and executed by the microprocessor of the computer 210, cause the computer 210 to perform the steps necessary to execute the steps or elements of the exemplary embodiments.

Figure 3:
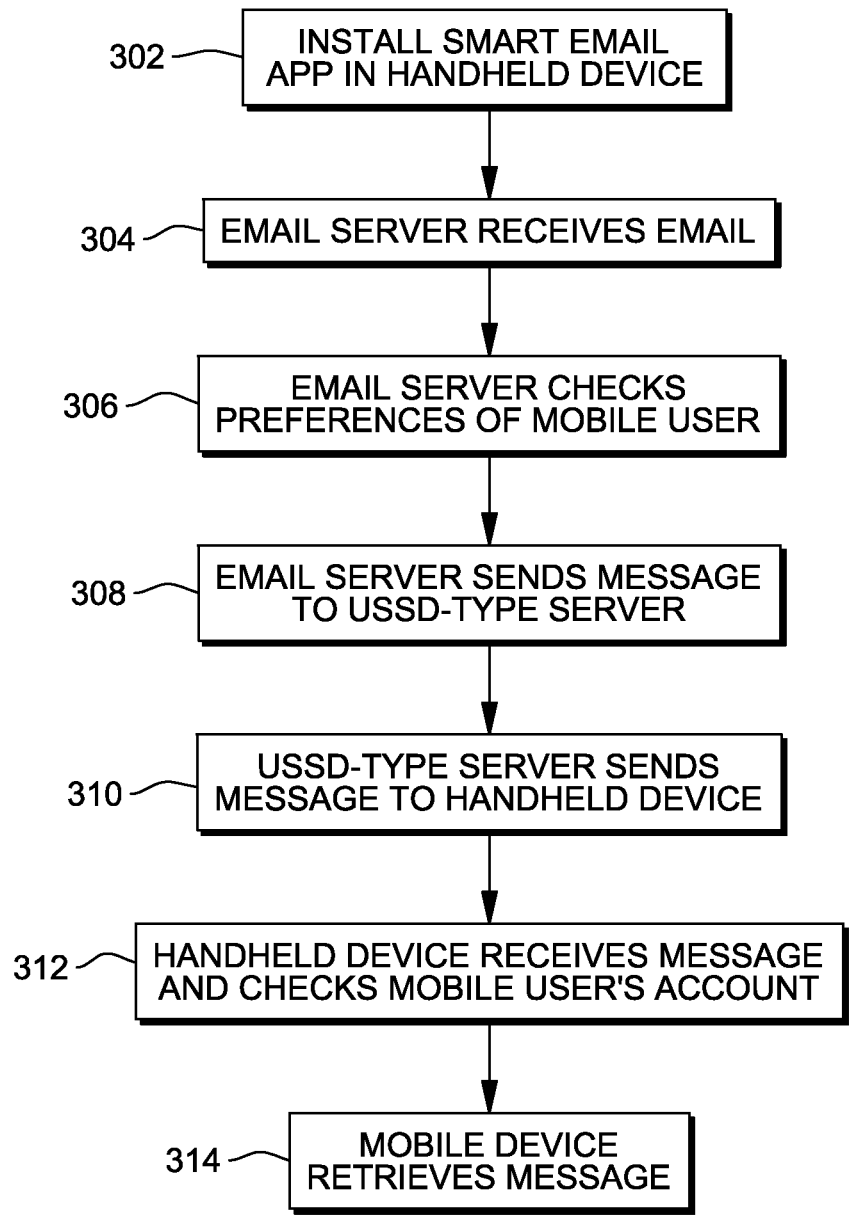
FIG. 3 is a flow chart of a method for implementing the exemplary embodiments.

The exemplary embodiments will be further discussed with reference to FIG. 3 in addition to FIG. 1. The mobile user may install a "Smart Email Mobile App" on his handheld device 112, as indicated in box 302. This application may have at least three functions. The first function is that the Smart Email Mobile App is capable of interfacing with the email server 102. By interfacing with the email server 102, the mobile user may configure the email account/mobile number and set the preferences like priority, based on the receipt subject, sender, size, attachment etc. Setting the preferences in the Smart Email Mobile App is a one-time activity and these preferences will be updated to the email server account in the email server 102 by the Smart Email Mobile App. The second function is that the Smart Email Mobile App "listens" for messages from the USSD-type server 104. The second function will be described in more detail hereafter. The third function is that the Smart Email Mobile App may retrieve email from the email server 102 after receiving a message from the USSD-type server 104. This function will also be discussed hereafter.

As indicated in box 304, the email server 102 receives an email for the mobile user.

Whenever an email is received by the email server 102 for the configured mobile user, the email server 102 will check the preferences of the mobile user, box 306. The preferences were previously set in the email server 102 by the Smart Email Mobile App.

If the email satisfies the configuration settings set by the mobile user, then the email server 102 may send a message to the USSD-type Server 104, box 308. This message may contain mobile user-related information such as the mobile number of the user or an email account of the mobile user. The message may be sent to the USSD-type server using any kind of protocol including internet protocols.

Then, as indicated in box 310, the USSD-type server will listen for any message from the email server 102. When a message is received, the USSD-type server 104 may invoke the "Smart Email Service" to send a USSD message (if it is a USSD server) or USSD-like message (if it is a non-USSD server) to the handheld device 112 of a particular mobile user based on the information sent by the email server 102. The message may include a special code in any predefined format. The special code may include information such as the address of the email server 102, the length of the email, number of attachments to the email, etc. This message may further contain additional information pertaining to the mobile user's email account. As a mobile user may have more than one email account configured with the Smart Email Mobile App, it is desirable to include email account information in the message.

After receiving the USSD or USSD-like message from the USSD-type server 104, the Smart Email Mobile App in the mobile user's handheld device 112 may check the message body and determine the email account for which the "new email" message has been sent, box 312.

Based on the email account information from the body of the USSD or USSD-like message, the Smart Email Mobile App may initiate the connection with the email server 102 to fetch the new email, box 314. The email may be fetched using any protocol such as GPRS (General Packet Radio Service).

As will be appreciated by one skilled in the art, aspects of the exemplary embodiments may be embodied as a system, method, service method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods, service methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A push email system comprising a mobile handheld device for a mobile user, an email server device and a separate unstructured supplementary service data (USSD)-type server device that provides real-time messaging, the mobile handheld device having a mobile application to interface with the email server device to configure the email server device, listen for messages from the USSD-type server device and retrieve an email from the email server device when the email meets the preferences of the mobile user, the email server device configured by the mobile application to receive email for an email account of the mobile user, check preferences of the mobile user, and, when the email satisfies the preferences of the mobile user, notify the USSD-type server device of the receipt of the email for the mobile user;

the USSD-type server device configured to send a real-time message to the mobile application, the real-time message including the mobile user's email account, length of the email and number of attachments, if any, to the email, the real-time message notifying the mobile application of the receipt of the email by the email server device for the account of the mobile user; and responsive to the receipt of the real-time message by the mobile application, the mobile application retrieves the email to the mobile handheld device directly from the email server device when the email meets the preferences of the mobile user.

2. The push email system of claim 1 wherein the USSD-type server is a USSD server that implements the USSD protocol and sends a USSD message.

3. The push email system of claim 2 wherein the real-time message is a USSD message.

4. The push email system of claim 2 wherein the handheld device is a GSM (Global System for Mobile Communications) handheld device.

5. The push email system of claim 2 wherein the handheld device is a non-GSM handheld device.

6. The push email system of claim 1 wherein the real-time message is a non-persistent SMS (Short Messaging Service) message.

7. The push email system of claim 6 wherein the handheld device is a non-GSM handheld device.

8. A push email system comprising a mobile handheld device for a mobile user, an email server device and a separate unstructured supplementary service data (USSD) server device that implements the USSD protocol and sends a USSD message, the email server device configured to receive email for an email account of the mobile user, check preferences of the mobile user, and, when the email satisfies the preferences of the mobile user, notify the USSD server device of the receipt of the email for the mobile user;

the mobile handheld device having a mobile application to interface with the email server device to configure the email server device, listen for messages from the USSD server device and retrieve the email from the email server device when the email meets the preferences of the mobile user, the USSD server device configured to send a USSD message to the mobile application, the real-time message including the mobile user's email account, length of the email and number of attachments, if any, to the email, the USSD message notifying the mobile application of the receipt of the email by the email server device for the account of the mobile user; and responsive to the receipt of the USSD message by the mobile application, the mobile application retrieves the email to the mobile handheld device directly from the email server device when the email meets the preferences of the mobile user.

9. The push email system of claim 8 wherein the handheld device is a GSM (Global System for Mobile Communications) handheld device.

10. The push email system of claim 8 wherein the handheld device is a non-GSM handheld device.

11. A method of pushing email to a mobile handheld device by a push email system comprising an email server device, a separate unstructured supplementary service data (USSD)-type server device that provides real-time messaging, and a mobile handheld device for a mobile user, the mobile handheld device having a mobile application to interface with the email server device to configure the email server device, listen for messages from the USSD-type server device and retrieve an email from the email server device when the email meets the preferences of the mobile user, the method including:

receiving, by an email server device, an email for an email account of a mobile user;

configuring the email server device, by the mobile application, to receive the email for an email account of the mobile user, check preferences of the mobile user, and, when the email satisfies the preferences of the mobile user, notify the USSD-type server device of the receipt of the email for the mobile user;

checking for preferences of the mobile user by the email server device;

when the email satisfies the preferences of the mobile user, notifying, by the email server device, an unstructured supplementary service data (USSD)-type server device of the receipt of the email by sending a message to the USSD-type server device, the message including information identifying the mobile user and the email account of the mobile user;

receiving, by the USSD-type server device, the message;

sending a real-time message to the mobile application, the real-time message including the mobile user's email account, length of the email and number of attachments, if any, to the email, the real-time message notifying the mobile application of the receipt by the email server device of the email for an account of the user; and responsive to the receipt of the real-time message by the mobile application, the mobile application retrieving the email to the mobile handheld device directly from the email server device when the email meets the preferences of the mobile user.

12. The method of claim 11 wherein the USSD-type server is a USSD server that implements the USSD protocol and sends a USSD message.

13. The method of claim 12 wherein the real-time message is a USSD message.

14. The method of claim 12 wherein the handheld device is a GSM (Global System for Mobile Communications) handheld device.

15. The method of claim 11 wherein the real-time message is a non-persistent SMS (Short Messaging Service) message.

16. The method of claim 15 wherein the handheld device is a non-GSM handheld device.

17. A method of pushing email to a mobile handheld device by a push email system comprising an email server device, a separate unstructured supplementary service data (USSD) server device that implements the USSD protocol and sends a USSD message, and a mobile handheld device for a mobile user, the mobile handheld device having a mobile application to interface with the email server device to configure the email server device, listen for messages from the USSD server device and retrieve an email from the email server device when the email meets the preferences of the mobile user, the method including:

receiving, by the email server device, an email for an email account of a mobile user;

configuring the email server device, by the mobile application, to receive the email for an email account of the mobile user, check preferences of the mobile user, and, when the email satisfies the preferences of the mobile user, notify the USSD server device of the receipt of the email for the mobile user;

checking for preferences of the mobile user by the email server device;

when the email satisfies the preferences of the mobile user, notifying, by the email server device, the USSD server device of the receipt of the email by sending a message to the USSD server device, the message including information identifying the mobile user and the email account of the mobile user;

receiving, by the USSD server device, the message;

sending a USSD message to the mobile application, the real-time message including the mobile user's email account, length of the email and number of attachments, if any, to the email, the message notifying the mobile application of the receipt by the email server device of the email for an account of the user; and responsive to the receipt of the real-time message by the mobile application, the mobile application retrieving the email to the mobile handheld device directly from the email server device when the email meets the preferences of the mobile user.

18. The method of claim 17 wherein the handheld device is a GSM (Global System for Mobile Communications) handheld device or a non-GSM handheld device.

\* \* \* \* \*